(12) United States Patent  
Shiraishi

(10) Patent No.: US 9,531,913 B1  
(45) Date of Patent: Dec. 27, 2016

(54) IMAGE PROCESSING APPARATUS AND METHOD FOR GENERATING CORRECTION FORMULA

(71) Applicants: KABUSHIKI KAISHA TOSHIBA, Tokyo (JP); TOSHIBA TEC KABUSHIKI KAISHA, Tokyo (JP)

(72) Inventor: Hiroyuki Shiraishi, Mishima Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/794,281

(22) Filed: Jul. 8, 2015

(51) Int. Cl.
*H04N 1/40* (2006.01)
*H04N 1/10* (2006.01)

(52) U.S. Cl.
CPC ............ *H04N 1/40* (2013.01); *H04N 1/1013* (2013.01)

(58) Field of Classification Search
None
See application file for complete search history.

(56) References Cited

U.S. PATENT DOCUMENTS

| 6,600,548 B2 * | 7/2003 | Enomoto | H04N 1/387 348/96 |
| 2011/0304893 A1 * | 12/2011 | Sakai | H04N 1/1017 358/513 |
| 2012/0307317 A1 | 12/2012 | Uchida | |

\* cited by examiner

*Primary Examiner* — Thomas D Lee
(74) *Attorney, Agent, or Firm* — Patterson & Sheridan, LLP

(57) ABSTRACT

An image processing apparatus includes a support member to support a sheet, a light source that extends in a main-scanning direction and is configured to move in a sub-scanning direction and irradiate light on the sheet as the light source moves in the sub-scanning direction, a conversion unit configured to generate multiple line image data based on light reflected by the sheet and incident thereon, as the light source moves in the sub-scanning direction, and a processing unit configured to carry out a correction process with respect to each of the line image data using a different correction formula for each of the line image data.

20 Claims, 9 Drawing Sheets

IMAGE PROCESSING APPARATUS AND METHOD FOR GENERATING CORRECTION FORMULA

FIELD

Embodiments described herein relate generally to an image processing apparatus and a method for generating a correction formula with respect to each line image data obtained by an image processing apparatus.

BACKGROUND

An image processing apparatus, such as a scanner, has a light source that irradiates a sheet to be scanned and scans an image on the sheet based on the light reflected by the sheet. Specifically, the light reflected by the sheet is incident on a plurality of photoelectric transducers that is linearly arranged in a main-scanning direction, and an image data signal corresponding to intensity of the light is output from each of the photoelectric transducers.

Typically, the light source moves in a sub-scanning direction to irradiate a scanning region (scanning line) of the sheet. However, the light from the light source may not irradiate the scanning region in the same manner (e.g., same angle and same distance from the scanning region) as the light source moves in the sub-scanning direction. As a result, the obtained image data may not have the same brightness values in two different regions, even though the original sheet has the same brightness in the two regions.

DETAILED DESCRIPTION

In general, according to one embodiment, an image processing apparatus includes a support member to support a sheet, a light source that extends in a main-scanning direction and is configured to move in a sub-scanning direction and irradiate light on the sheet as the light source moves in the sub-scanning direction, a conversion unit configured to generate multiple line image data based on light reflected by the sheet and incident thereon, as the light source moves in the sub-scanning direction, and a processing unit configured to carry out a correction process with respect to each of the line image data using a different correction formula for each of the line image data.

Hereinafter, an image processing apparatus 100 of an embodiment will be described with reference to the accompanying drawings. The same configurations are given the same reference number in each drawing. The image processing apparatus 100 is one type of a paper-feeding apparatus.

Figure 1:
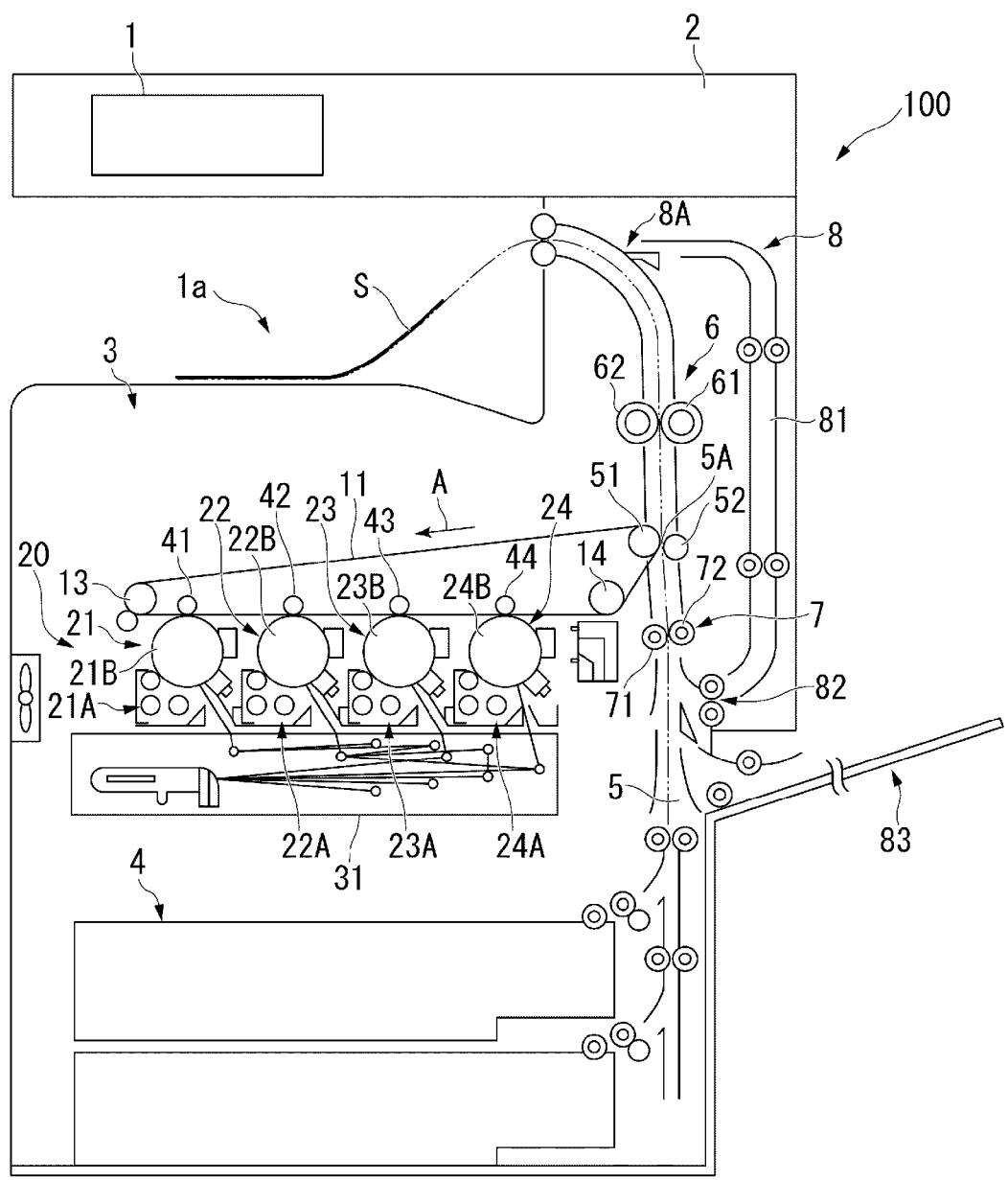
FIG. 1 illustrates configuration of an image processing apparatus according to an embodiment.

FIG. 1 illustrates configuration of the image processing apparatus 100 according to the embodiment.

As illustrated in FIG. 1, the image processing apparatus 100 includes a scanner unit 2, a printer unit 3, and a sheet storage unit 4 and is configured as an image forming apparatus. The image processing apparatus 100, without being limited to the above configuration, may be configured to include the scanner unit 2 only.

The scanner unit 2 scans an image of a target to be copied based on intensity of light incident thereon. The scanner unit 2 outputs image information corresponding to the scanned image to the printer unit 3.

The printer unit 3 transfers an output image (hereinafter, referred to as a "toner image"), which is visualized with developers such as toners, to a sheet S, which is a transfer medium, based on the image information output from the scanner unit 2. Then, the printer unit 3 fixes the toner image on the sheet S by applying heat and pressure onto the sheet S to which the toner image is transferred.

The sheet storage unit 4 contains a plurality of the sheets S with respect to each predetermined size of the sheet S. The sheet storage unit 4 provides one sheet S at a time to the printer unit 3 at the timing of forming the toner image at the printer unit 3.

A transport path 5 through which the sheet S is transported from the sheet storage unit 4 toward the printer unit 3 is disposed between the sheet storage unit 4 and the printer unit 3. A transfer position 5A is located at a middle portion of the transport path 5. The transfer position 5A is a position where the toner image formed at the printer unit 3 is transferred to the sheet S. Then, the sheet S is transported to a fixing device 6 via the transfer position 5A.

In the embodiment, an upstream side of a sheet conveying direction along the transport path 5 is referred to as an upstream side of the transport path 5. A downstream side of the sheet conveying direction along the transport path 5 is referred to as a downstream side of the transport path 5.

An intermediate transfer belt 11 is disposed in the image processing apparatus 100. For example, the intermediate transfer belt 11 is disposed on a lower side of the fixing device in the perpendicular direction. For example, the intermediate transfer belt 11 is an insulating film with a predetermined thickness and is formed into a belt shape. The intermediate transfer belt 11 may be a thin sheet-shaped metal of which the surfaces are protected by resin and the like.

A predetermined tensile force is applied to the intermediate transfer belt 11 by a transfer drive roller 51, a first tension roller 13, and a second tension roller 14. A position on the intermediate transfer belt 11 moves in arrow A direction by the transfer drive roller 51 rotating. In other words, the belt surface of the intermediate transfer belt 11 circulates in one direction at the moving speed of the outer circumferential surface of the transfer drive roller 51.

An image forming portion 20 is disposed along a section where the belt surface of the intermediate transfer belt 11 substantially moves like a flat surface in a state in which the predetermined tensile force is applied.

The image forming portion 20 includes image forming units 21, 22, 23, and 24. The image forming units 21, 22, 23, and 24 are disposed at a predetermined interval. The image forming units 21, 22, 23, and 24 are disposed between the first tension roller 13 and the second tension roller 14.

The image forming units 21, 22, 23, and 24 include developing devices 21A, 22A, 23A, and 24A, respectively, and photoreceptors 21B, 22B, 23B, and 24B, respectively. Each of the developing devices 21A, 22A, 23A, and 24A accommodates a toner of a color. For example, the developing devices 21A, 22A, 23A, and 24A accommodate cyan (C), magenta (M), yellow (Y), and black (BK) toners, respectively.

An exposing device 31 is disposed at a position that faces the photoreceptors 21B, 22B, 23B, and 24B. The exposing device 31 forms electrostatic images that correspond to the colors to be developed with respect to the photoreceptors 21B, 22B, 23B, and 24B. The toners are selectively supplied to the photoreceptors 21B, 22B, 23B, and 24B by the developing devices 21A, 22A, 23A, and 24A, respectively. Accordingly, the electrostatic images on the surfaces of the photoreceptors 21B, 22B, 23B, and 24B are developed with the corresponding toners. As a consequence, toner images are formed on the surfaces of the photoreceptors 21B, 22B, 23B, and 24B.

Facing rollers 41, 42, 43, and 44 are provided at positions that face the photoreceptors 21B, 22B, 23B, and 24B with the intermediate transfer belt 11 disposed between the facing rollers and the photoreceptors. The facing rollers 41, 42, 43, and 44 presses the intermediate transfer belt 11 towards the photoreceptors 21B, 22B, 23B, and 24B, respectively. Accordingly, the toner images formed on the photoreceptors 21B, 22B, 23B, and 24B are transferred to the intermediate transfer belt 11. The toner images on the surfaces of the photoreceptors 21B, 22B, 23B, and 24B are sequentially transferred to the intermediate transfer belt 11 at a predetermined timing. By transferring, the toner images of each color are formed on the intermediate transfer belt 11. The toner images of each color are superimposed on each other at a predetermined position on the surface of the intermediate transfer belt 11.

A transfer passive roller 52 that is in contact with the intermediate transfer belt 11 at a predetermined pressure is disposed at the transfer position 5A, which is disposed on the middle portion of the transport path 5. The transfer passive roller 52 is pressed towards the transfer drive roller 51 with the intermediate transfer belt 11 disposed therebetween.

A bias is applied between the transfer drive roller 51 and the transfer passive roller 52. Accordingly, the charged toners move from the intermediate transfer belt 11 to the transfer passive roller 52. The toner images of each color are transferred from the intermediate transfer belt 11 to the sheet S at the transfer position 5A.

Meanwhile, when the toner images are not transferred to the sheet S, the transfer passive roller 52 is moved at a receding position by a roller release mechanism, which is not illustrated in the drawing. As the receding position, the transfer passive roller 52 is not in contact with the intermediate transfer belt 11.

A pair of resist rollers 7 is disposed at a predetermined position along the transport path 5 from the sheet storage unit 4 to the transfer position 5A. The sheet S transported from the sheet storage unit 4 passes through the pair of resist rollers 7 before entering the transfer position 5A. The pair of the resist rollers 7 adjusts the transport direction of the sheet S that enters the transfer position 5A.

The sheet S transported along the transport path 5 from the sheet storage unit 4 to the transfer position 5A abuts the pair of resist rollers 7 and temporarily stops. This corrects inclination of the sheet S with respect to the transport direction.

The toner images on the intermediate transfer belt 11 are transported to the transfer position 5A by the intermediate transfer belt 11. The pair of resist rollers 7 rotates again at the timing of the toner images arriving at a place close to the transfer position 5A. The toner images are transported by the intermediate transfer belt 11 and reach the transfer position 5A. The sheet S arrives at the transfer position 5A at the timing of the toner images reaching the transfer position 5A. The sheet S passes through the transfer position 5A. Consequently, the toner images are transferred to the sheet S.

The fixing device 6 applies heat and pressure to the toner images that are transferred to the sheet S. The toner images are fixed on the sheet S by the heat and the pressure applied thereto.

The sheet S where the toner images are fixed by the fixing device 6 is guided to a sheet discharging unit 1a along the transport path 5. The sheet discharging unit 1a is a part of an exterior cover that covers the printer unit 3. The sheet discharging unit 1a is located at a space between the scanner unit 2 and the sheet discharging unit 1a.

A branch point 8A that guides the sheet S in a direction which is different from a direction towards the sheet discharging unit 1a is disposed further downstream of the transport path 5 with respect to the fixing device 6. In case of double-sided printing on the sheet S, the sheet S is temporarily conveyed towards the sheet discharging unit 1a. Subsequently, the sheet S is drawn into the printer unit 3. Then, the sheet S is guided to an inverting unit 8 via the branch point 8A.

The inverting unit 8 transports the sheet S along a transport path 81 in the inverting unit 8.

A pair of inverting unit resist rollers 82 is disposed in the inverting unit 8.

The pair of inverting unit resist rollers 82, similarly to the pair of resist rollers 7, temporarily stops the sheet S that is transported through the transport path 81. This corrects the inclination of the sheet S. In addition, the pair of inverting unit resist rollers 82 resumes transporting the sheet S at the timing when the toner images reaches a point close to the transfer position 5A. The sheet S transported from the pair of inverting unit resist rollers 82 enters the transport path 5.

A position where the sheet S discharged from the pair of inverting unit resist rollers 82 enters the transport path 5 exists on the transport path 5. The sheet S is inserted from a manual feed tray 83, from further upstream side of the transport path 5 with respect to the position where the sheet S joins the transport path 5.

Figure 2:
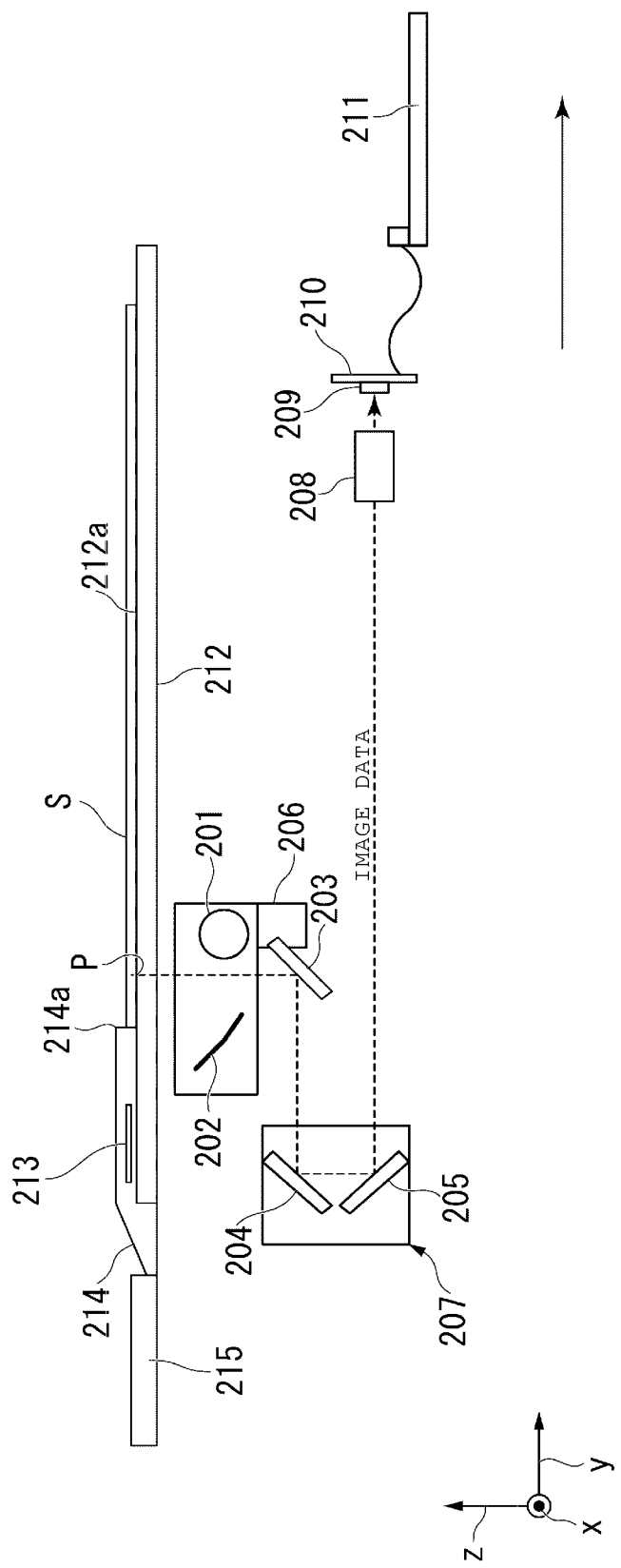
FIG. 2 illustrates configuration of a scanner unit of the image processing apparatus.

Next, the configuration of the scanner unit 2 will be described with reference to FIG. 2. FIG. 2 illustrates configuration of the scanner unit 2.

As illustrated in FIG. 2, the scanner unit 2 includes a light source 201, a reflector 202, a first mirror 203, a second mirror 204, a third mirror 205, a first carriage 206, a second carriage 207, a condenser lens 208, a charge coupled device (CCD) sensor 209, a CCD substrate 210, a scanner control substrate 211, a document platen glass 212, a shading plate 213, a document scale 214, and a through-read glass 215. The scanner unit 2 may include an automatic document feed (ADF) unit.

Here, the direction in which the light source 201 moves is referred to as a sub-scanning direction y. A direction that is orthogonal to the sub-scanning direction y on the surface of the document platen glass 212 is referred to as a main-scanning direction x. The direction that is orthogonal to the main-scanning direction x and the sub-scanning direction y is referred to as z direction.

The document platen glass 212 includes a placement surface 212a on which the sheet S is placed. The shading plate 213 is formed of a white member. The shading plate 213 is a white reference unit for performing shading correction on the image information obtained from the sheet S. The shading plate 213 has a long shape in the main-scanning direction x. The document scale 214 can be used to place the sheet S at a predetermined position on the document platen glass 212. A tip end position 214a is disposed at an end portion of the document scale 214.

In FIG. 2, the sheet S is placed on the placement surface 212a of the document platen glass 212. The sheet S is placed at a predetermined scanning position on the placement surface 212a. The tip end of the sheet S placed at the scanning position is in contact with the tip end position 214a of the document scale 214. Accordingly, the position of the sheet S on the document platen glass 212 is fixed. Although not described in detail, a position to which the corner of the tip end of the sheet S is aligned is set in advance on the placement surface 212a. Aligning the corner of the tip end of the sheet S to the position set in advance determines the position of the sheet S in the main-scanning direction x and the sub-scanning direction y. The position used to align the corner of the tip end of the sheet S is set on the tip end position 214a.

The light source 201 emits light. The reflector 202 reflects the light emitted from the light source 201. The shading plate 213 and the sheet S are uniformly irradiated with the light reflected by the reflector 202. This adjusts the light distribution characteristics in the main-scanning direction x at the reading position of the sheet S. The first mirror 203 receives the light reflected by the shading plate 213 and the sheet S. The first mirror 203 guides the light reflected by the shading plate 213 and the sheet S to the second mirror 204.

The second mirror 204 receives the light reflected by the first mirror 203. The second mirror 204 guides the light reflected by the first mirror 203 to the third mirror 205. The third mirror 205 receives the light reflected by the second mirror 204. The third mirror 205 guides the light reflected by the second mirror 204 to the condenser lens 208. The condenser lens 208 condenses the light reflected by the third mirror 205. An image is formed on an imaging surface (reading surface) of the CCD sensor 209 according to the light condensed by the condenser lens 208.

The CCD sensor 209 is mounted on the CCD substrate 210. For example, the CCD sensor 209 is a hybrid four-line sensor. The hybrid four-line sensor includes a three-line sensor that reads a color image and a one-line sensor that reads a monochrome image. The three-line sensor, which scans a color image, detects red (R), green (G), and blue (B) lights.

The CCD sensor 209 photoelectrically converts the light energy of an image formed with the condenser lens 208 into electric charge. Accordingly, the CCD sensor 209 converts the image formed with the condenser lens 208 into an electric signal. The CCD substrate 210 outputs the electric signal that the CCD sensor 209 photoelectrically converted to the scanner control substrate 211.

The light source 201, the reflector 202, and the first mirror 203 are mounted on the first carriage 206. The second mirror 204 and the third mirror 205 are mounted on the second carriage 207. The first carriage 206 moves in the main-scanning direction x by a driving unit, which is not illustrated in the drawing. The second carriage 207 is driven to move in the same direction as that of the first carriage 206 at a half speed of the first carriage 206. Therefore, the optical path length of the light guided to the imaging surface of the CCD sensor 209 does not change even when the first carriage 206 moves. That is, the optical path length from the placement surface 212a to the imaging surface of the CCD sensor 209 is constant all the time in the optical system configured of the first mirror 203, the second mirror 204, and the third mirror 205.

For example, the first carriage 206 moves from the left to the right along the sub-scanning direction y in FIG. 1. Accordingly, the image on the sheet S placed on the placement surface 212a is scanned. A scanning position P with respect to the sheet S also moves along with the first carriage 206 moving in the sub-scanning direction y. The scanning position P moves from the left to the right along the sub-scanning direction y. The scanning position P corresponds to one line extending in the main-scanning direction x. The image on the sheet S at the scanning position P is sequentially formed on the imaging surface of the CCD sensor 209 as the scanning position P moves in the sub-scanning direction y. The CCD sensor 209 photoelectrically converts the light energy of the image and outputs image data. The CCD sensor 209 outputs the image data at the scanning position P as one-line image data Dx in the main-scanning direction x. The CCD sensor 209 converts the image on the entire sheet S into image data DX based on the multiple-line image data Dx.

A plurality of photodiodes is arranged along the imaging surface of the CCD sensor 209. The CCD sensor 209 scans the one-line image data Dx in the main-scanning direction x based on the output from the plurality of photodiodes that are arranged. The CCD sensor 209 generates the one-line image data Dx for each different position in the sub-scanning direction y when the light source 201 moves along the sub-scanning direction y. That is, the CCD sensor 209 outputs the multiple-line image data Dx corresponding to the number of lines in the sub-scanning direction y.

In the embodiment, a line number that indicates a position in the sub-scanning direction y is assigned to each of the one-line image data Dx. The image data that the scanner unit 2 initially generates is referred to as first line image data D1. Similarly, the image data that the scanner unit 2 secondarily generates is referred to as second image data D2. The one-line image data Dx includes data units corresponding to the number of pixels of the CCD sensor 209. The one-line image data Dx includes 7500 data units in the embodiment.

Figure 3:
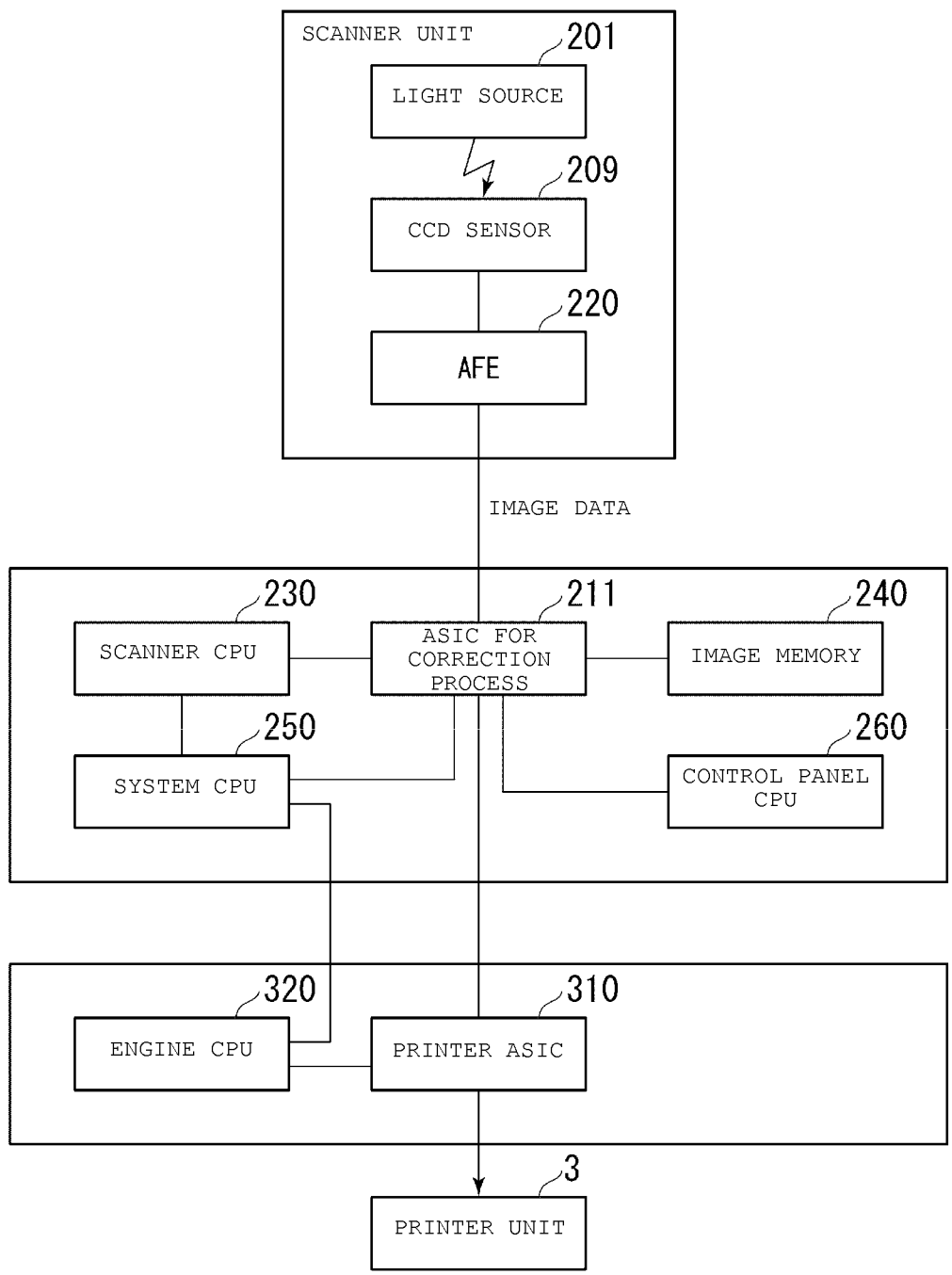
FIG. 3 is a block diagram of the image processing apparatus.

Next, functional configuration of the image processing apparatus 100 will be described with reference to FIG. 3. FIG. 3 is a block diagram of the image processing apparatus 100.

The CCD sensor 209 outputs the photoelectrically-converted electric signal to an analog front end (AFE) 220. The AFE 220 converts the input electric signal from an analog signal into a digital signal. The AFE 220 outputs the electric signal converted into the digital signal to an application-specific integrated circuit (ASIC) 211 for correction process. The AFE 220 is mounted on the CCD substrate 210 or the scanner control substrate 211.

The ASIC for correction process 211 is connected to a scanner central processing unit (CPU) 230, an image memory 240, a system CPU 250, and a control panel CPU 260.

The scanner CPU 230 controls the entire operations of the scanner unit 2.

The image memory 240 stores the image data generated by the scanner unit 2. For example, the image memory 240 is a memory unit such as a semiconductor memory device, a magnetic memory device, and a hard disk drive (HDD).

The system CPU 250 controls the entire operations of the image processing apparatus 100.

The control panel CPU 260 controls a control panel 1.

The scanner CPU 230 is connected to the system CPU 250. The ASIC for correction process 211 is connected to a printer ASIC 310. The printer ASIC 310 is connected to the printer unit 3 and an engine CPU 320.

The printer ASIC 310 controls the entire operations of the printer unit 3.

The engine CPU 320 controls the operation of a drive unit and the like that rotate rollers.

Figure 4:
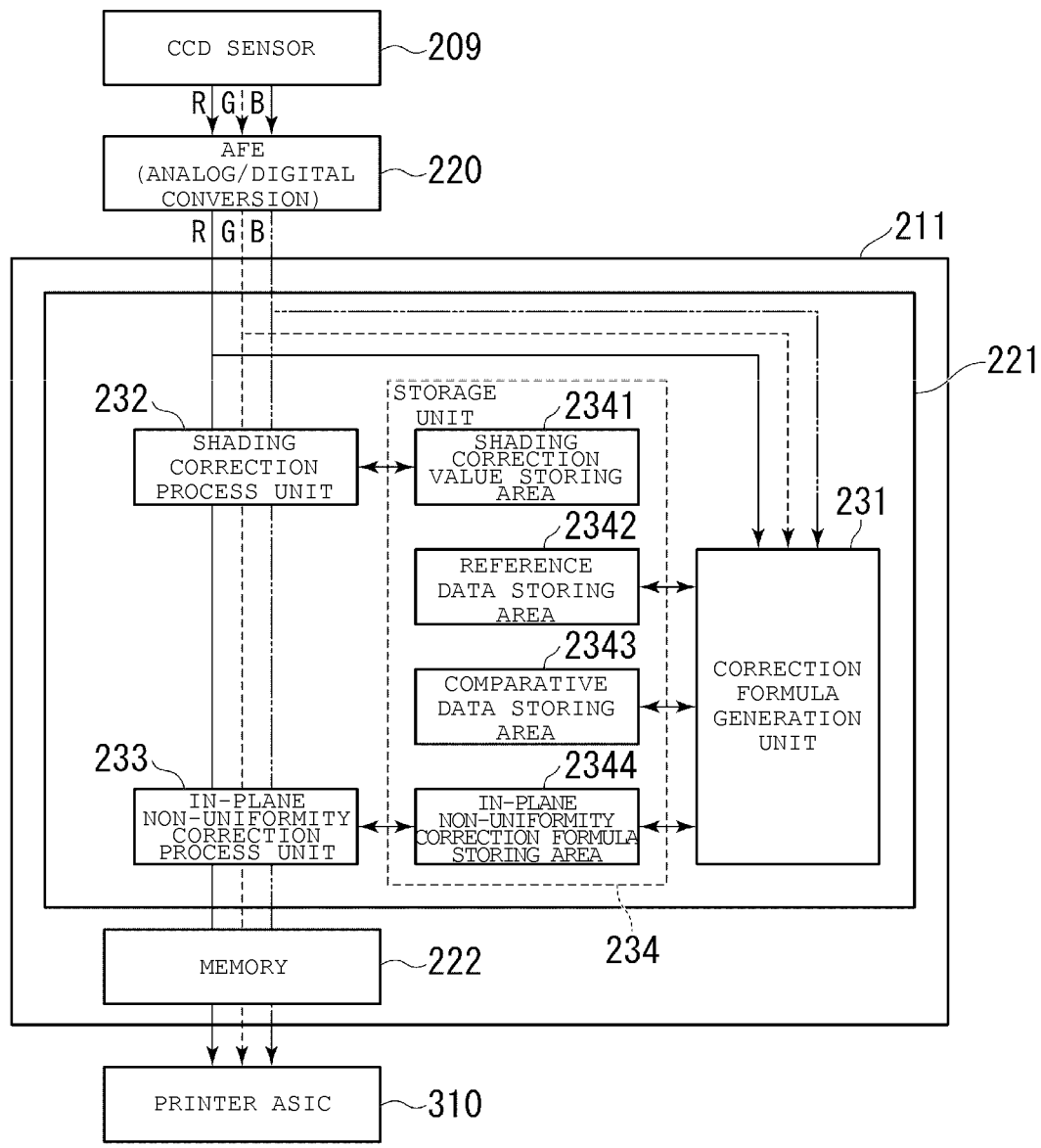
FIG. 4 is a block diagram of an ASIC for correction process provided in the image processing apparatus.

Next, an example of the ASIC 211 will be described with reference to FIG. 4. FIG. 4 is a block diagram of the ASIC 211.

A correction formula generation unit 231, a shading correction process unit 232, and an in-plane non-uniformity correction process unit 233 are functional software units achieved by the ASIC 211 executing a program stored in a storage unit 234. Alternatively, the correction formula generation unit 231, the shading correction process unit 232, and the in-plane non-uniformity correction process unit 233 may be achieved by hardware. A configuration of the correction formula generation unit 231, the shading correction process unit 232, and the in-plane non-uniformity correction process unit 233 is included in a correction unit 221. A part or all of the correction formula generation unit 231, the shading correction process unit 232, and the in-plane non-uniformity correction process unit 233 may be functional hardware units such as CPUs and large scale integration (LSI). In addition, the storage unit 234 may be a read-only memory (ROM) or a random access memory (RAM).

The storage unit 234 includes a shading correction value storing area 2341, a reference data storing area 2342, a comparative data storing area 2343, and an in-plane non-uniformity correction formula storing area 2344.

Reference data is stored in the reference data storing area 2342. The reference data is image data Dv that corresponds to a reference line V set in advance among the image data Dx of the entire lines that the CCD sensor 209 scans. The 500th line is set as the reference line V in the embodiment.

Comparative data is stored in the comparative data storing area 2343. The comparative data is image data Dw that corresponds to a comparative line W set in advance among the image data Dx of the entire lines that the CCD sensor 209 reads. For example, every line from the 501st line to the last line is set as the comparative line W. In addition, a representative line between the 501st line and the last line may be the comparative line W. In the embodiment, the representative lines are the 2500th, the 4500th, the 6500th, and the 8500th lines.

The shading correction value storing area 2341 stores a shading correction value generated by the shading correction process unit 232. The shading correction value storing area 2341 stores a correction value $\alpha_y$ with respect to each pixel lined up in the main-scanning direction x. Each of the correction values is associated with a pixel number (x=1 to 7,500) that indicates a position in the main-scanning direction x.

The in-plane non-uniformity correction formula storing area 2344 stores a correction formula $f_y$ that is generated by the correction formula generation unit 231. The in-plane non-uniformity correction formula storing area 2344 stores the correction formulas $f_y$ of which the number corresponds to the number of lines of a correction target. Each of the correction formulas $f_y$ is associated with a line number that indicates a position in the sub-scanning direction y.

The correction formula generation unit 231 generates the correction formula $f_y$ based on the image data of an image for correction obtained from a sheet for correction Sr. For example, the sheet for correction Sr is a white paper sheet. An example of the correction formula is illustrated in Expression 1.

Correction Formula $$f_y(x)=Dx+(Dv-Dw)\times Dx\div Dw \qquad \text{Expression 1}$$

Dx is the one-line image data Dx of the sheet, which is the correction target.

Dv is the one-line image data that corresponds to the reference line V.

Dw is the one-line image data that corresponds to the comparative line W.

For example, the correction formula $f_y$ in Expression 1 is stored in the in-plane non-uniformity correction formula storing area 2344. Specific values for "Dv" and "Dw" in the correction formula $f_y$ are stored in the in-plane non-uniformity correction formula storing area 2344. Specific values for "Dx" in the correction formula $f_y$ is not stored. The one-line image data Dx is input to "Dx" in the correction formula $f_y$ when an image on the sheet S, which is the correction target, is scanned.

The correction formula generation unit 231 acquires the values of the reference data Dv from the reference data storing area 2342. In addition, the correction formula generation unit 231 acquires the values of the comparative data Dw from the comparative data storing area 2343. The correction formula generation unit 231 assigns the values of the reference data Dv and the comparative data Dw in the correction formula illustrated in Expression 1, and generates the correction formula $f_y$ that corresponds to the same line as that of the comparative data Dw. The correction formula generation unit 231 associates the generated correction formula $f_y$ with the line number of the comparative data Dw, and writes into the in-plane non-uniformity correction formula storing area 2344.

The shading correction process unit 232 obtains the correction value $\alpha_y$ for each pixel based on the image data generated when the shading plate 213 is scanned. Specifically, the shading correction process unit 232 obtains the difference between the level of the image data obtained from the shading plate 213 and a predetermined target value, with respect to each pixel. The shading correction process unit 232 obtains the correction value $\alpha_y$ based on the obtained difference. When the level of the image data obtained from the shading plate 213 is lower than the target value, the shading correction process unit 232 generates a correction value $\alpha_y$ that corrects the level of the image data of the corresponding pixel so as to raise the level. When the level of the image data obtained from the shading plate 213 is higher than the target value, the shading correction process unit 232 generates a correction value $\alpha_y$ that corrects the pixel level of the image data of the corresponding pixel so as to reduce the level.

Incidentally, there is some variation of values among pixels in the one-line image data. This variation may happen when the installed position and the like of the plurality of photodiodes that configures the CCD sensor 209 slightly differ. The shading correction process unit 232 obtains a correction value $\alpha_y$ that makes variations in the values uniform.

Correction values generally used in shading correction are applicable to the correction value $\alpha_y$.

The shading correction process unit 232 associates the obtained correction value $\alpha_y$ with the pixel number and writes into the shading correction value storing area 2341.

When an image of the sheet S, which is the correction target, is scanned, the shading correction process unit 232 performs shading correction with respect to each one-line image data Dx. The shading correction is for correcting each value included in the one-line image data Dx based on the corresponding correction value $\alpha_y$. For example, the shading correction process unit 232 multiplies each value of pixels included in the one-line image data Dx by the corresponding correction value $\alpha_y$.

When the image of the sheet S is scanned, the in-plane non-uniformity correction process unit 233 performs in-plane non-uniformity correction on each one-line image data Dx. The in-plane non-uniformity correction means obtaining the calculation result of the correction formula $f_y$ by assigning the value of the one-line image data Dx in the correction formula $f_y$ illustrated in Expression 1. For example, the in-plane non-uniformity correction process unit 233 acquires a correction formula $f_y$ that is associated with the line number of the image data to be corrected from the in-plane non-uniformity correction formula storing area 2344. The in-plane non-uniformity correction process unit 233 replaces the image data Dx in the read correction formula $f_y$ with the one-line image data Dx to be corrected. The in-plane non-uniformity correction process unit 233 performs the in-plane non-uniformity correction on the image data Dx with respect to each of the entire lines. The in-plane non-uniformity correction process unit 233 outputs the image data after the correction.

Figure 5:
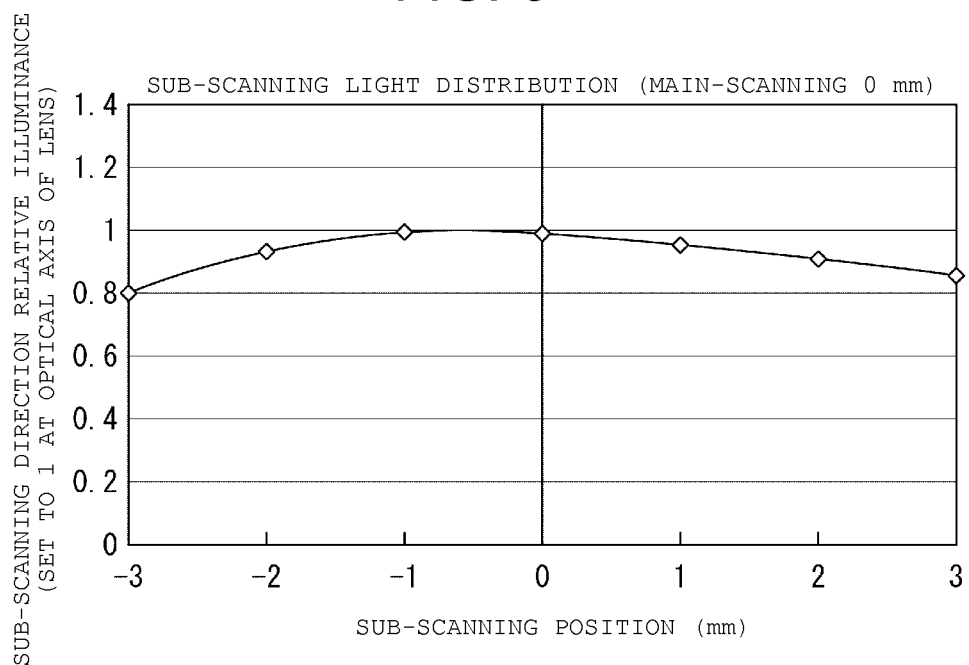
FIG. 5 illustrates a relationship between a gap between a scanning position and an optical axis of a light source and the illuminance.

Next, an illuminance stability area will be described with reference to FIGS. 5 to 7. FIG. 5 illustrates a relationship between the position of an optical axis and the illuminance.

In the graph of FIG. 5, the horizontal axis indicates a position of the placement surface 212*a* in the sub-scanning direction y, and the vertical axis indicates a relative illuminance in the sub-scanning direction y. The graph indicates light distribution characteristics in the sub-scanning direction. The position of the placement surface 212*a* corresponds to a position of the lens 208 through which the light passes.

When the position of the placement surface 212*a* on the horizontal axis is 0 mm, the light from that point passes through an optical axis of the lens 208. That is, the difference between the optical axis of the light that passes through the lens 208 and a position set to scan the image is 0 mm. The relative illuminance decreases as the difference between the optical axis of the light that passes through the lens 208 and the set position increases.

Figure 6:
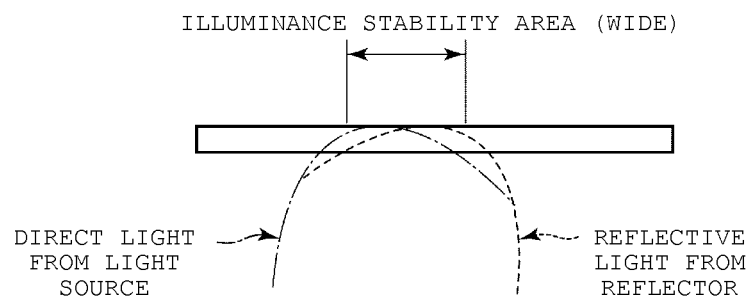
FIG. 6 illustrates light distribution in a wide illuminance stability area.

FIG. 6 illustrates a state in which lights from the light source and the reflector form a wide illuminance stability area. FIG. 7 illustrates a state in which lights from the light source and the reflector form a narrow illuminance stability area.

Figure 7:
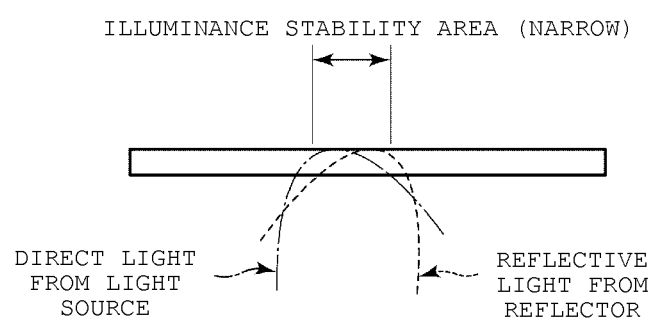
FIG. 7 illustrates light distribution in a narrow illuminance stability area.

FIG. 6 and FIG. 7 show difference regarding light distribution of direct light from the light source 201 and light distribution of reflective light from the reflector 202. The light distribution illustrated in FIG. 6 is wide, as compared with the light distribution in FIG. 7.

The light distribution of the direct light and the reflective light is known to be different depending on the extent of assembling variations of mirrors and the light source 201. That is, the assembling variation may cause a difference between the optical axis of the light that passes through the lens 208 and the position set for scanning. The illuminance stability area is wide as illustrated in FIG. 6 when there is no difference between the optical axis of the light that passes through the lens 208 and the set position. The illuminance stability area is narrow as illustrated in FIG. 7 when there is some difference between the optical axis of the light that passes through the lens 208 and the set position.

The illuminance decreases as the set position is apart from the illuminance stability area. In this case, the brightness indicated by the image data read from the sheet S, which is the reading target, becomes darker than the brightness of the actual reading target.

Figure 8:
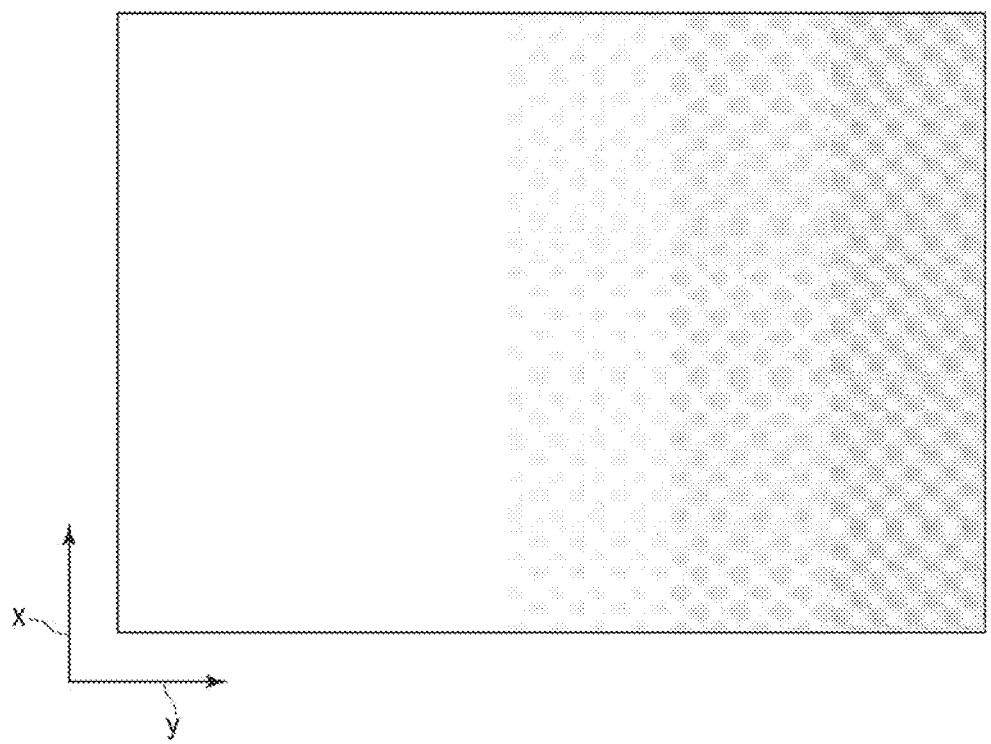
FIG. 8 illustrates an example of a brightness distribution of image data.

Next, a relationship between the relative illuminance in the sub-scanning direction y and the brightness of the image will be described with reference to FIG. 8. FIG. 8 illustrates an example of the brightness of an image based on image data generated without the in-plane non-uniformity correction.

The brightness of the image based on the generated image data is not uniform in the sub-scanning direction y in the image illustrated in FIG. 8. The brightness becomes darker toward the right in the sub-scanning direction y. This is because the relative illuminance decreases as the scanning position with the light source 201 moves in the sub-scanning direction y.

For example, when the illuminance stability area is wide, the illuminance at the set position may not decrease significantly as the scanning position moves in the sub-scanning direction y decreases. However, when the illuminance stability area is narrow, the illuminance at the set position may decrease significantly as the scanning position moves in the sub-scanning direction y decreases. In the latter case, the image data with the different brightness in the sub-scanning direction y may be generated as illustrated in FIG. 8. As described above, the brightness of the image based on the image data obtained through the scanning is known to change because of the variations of the illuminance in the sub-scanning direction y.

Figure 9:
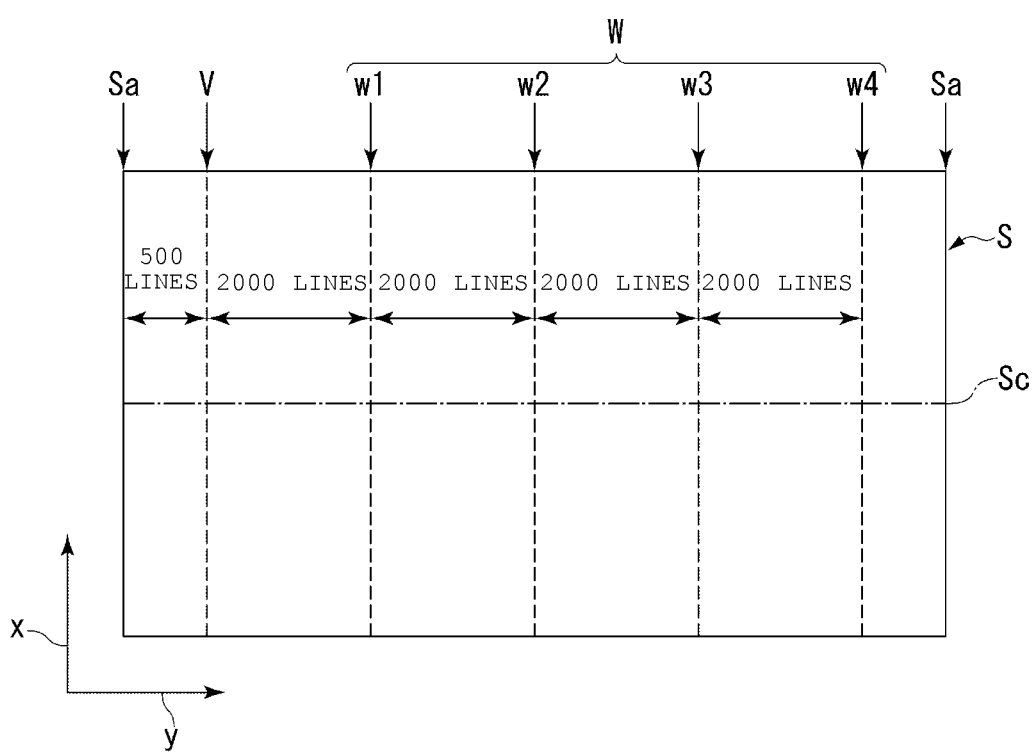
FIG. 9 illustrates a reference line and a comparative line in a sheet region.

Next, an example of the reference line V and the comparative line W will be described with reference to FIG. 9. FIG. 9 illustrates the reference line V and the comparative lines W in the sheet S.

The sheet S is placed on the placement surface 212*a* in a state in which a tip end Sa of the sheet S is in contact with the tip end position 214*a*. The reference line V is set to be the 500th line from the tip end position 214*a*. That is, reference line V is the 500th line from the tip end Sa of the sheet S. The comparative lines W include a plurality of comparative lines W1 to W4. The comparative lines W1, W2, W3, and W4 are respectively set to be the 2500th, the 4500th, the 6500th, and the 8500th lines from the tip end position 214*a*.

That is, the comparative line W1 is the 2000th line from the reference line V. The comparative line W2 is the 2000th line from the comparative line W1. The comparative line W3 is the 2000th line from the comparative line W2. The comparative line W4 is the 2000th line from the comparative line W3.

A center line Sc of the sheet S is a center line of the sheet S in the main-scanning direction x. The center line Sc is parallel to the sub-scanning direction y.

The comparative lines W include four lines in the drawing, but the number of the comparative lines W is not limited thereto. For example, the comparative line may be any line other than the reference line V among the entire lines scanned by the CCD sensor 209. However, the first to 499th lines are preferably excluded from the comparative lines W.

Figure 10:
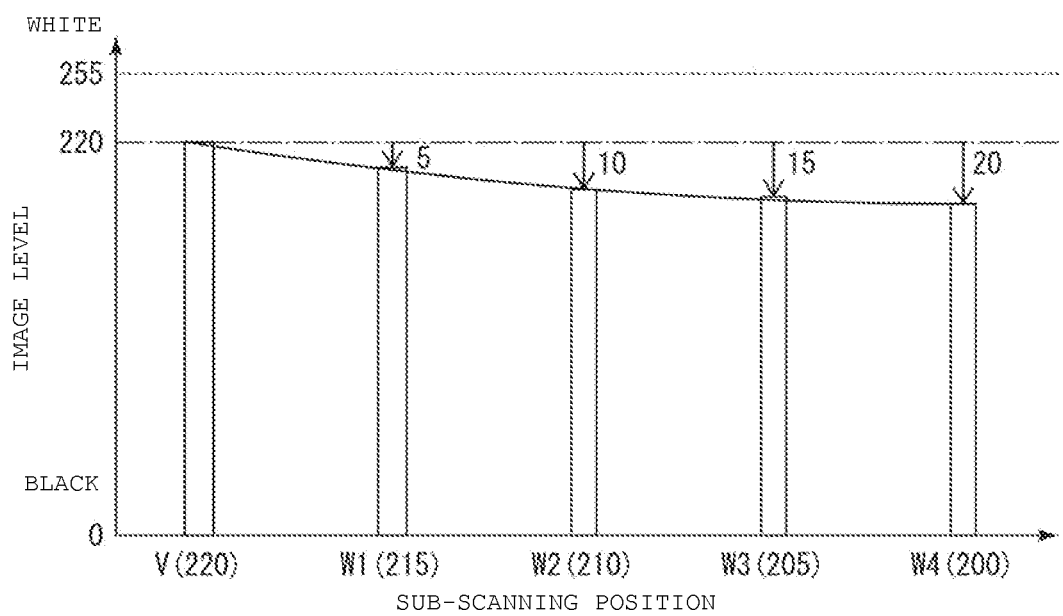
FIG. 10 illustrates a relationship between an image level of the image data and a detection position.

Next, a relationship between an image level of the image data Dx and the scanning position will be described with reference to FIG. 10. FIG. 10 illustrates the relationship between the image level of the image data Dx and the scanning position.

The image level of the image data Dx ranges from 0 to 255. The image level being 0 indicates that the corresponding pixel is a black color. The image level being 255 indicates that the corresponding pixel is a white color. Other image levels therebetween indicate shades between black and white. The color of the pixel becomes darker as the image level becomes close to 0, and the color becomes lighter as the image level becomes close to 255.

The image level gradually decreases from the reference line V in FIG. 10. This may occur when there is variation in the light distribution of the illuminance in the sub-scanning direction y.

Specifically, the image level of the comparative line W1 is 215. That is, the image level of the comparative line W1 is five points lower than the image level of the reference line V.

The image level of the comparative line W2 is 210. That is, the image level of the comparative line W2 is 10 points lower than the image level of the reference line V.

The image level of the comparative line W3 is 205. That is, the image level of the comparative line W3 is 15 points lower than the image level of the reference line V.

The image level of the comparative line W4 is 200. That is, the image level of the comparative line W4 is 20 points lower than the image level of the reference line V.

In this example, the correction formula generation unit 231 generates the correction formulas $f_y$ illustrated as follows.

$f_y(2500)=Dx+(220-215)\times Dx \div 215=Dx+5\times Dx \div 215$   Expression 2

$f_y(4500)=Dx+(220-210)\times Dx \div 210=Dx+10\times Dx \div 210$   Expression 3

$f_y(6500)=Dx+(220-205)\times Dx \div 205=Dx+15\times Dx \div 205$   Expression 4

$f_y(8500)=Dx+(220-200)\times Dx \div 200=Dx+20\times Dx \div 200$   Expression 5

Figure 11:
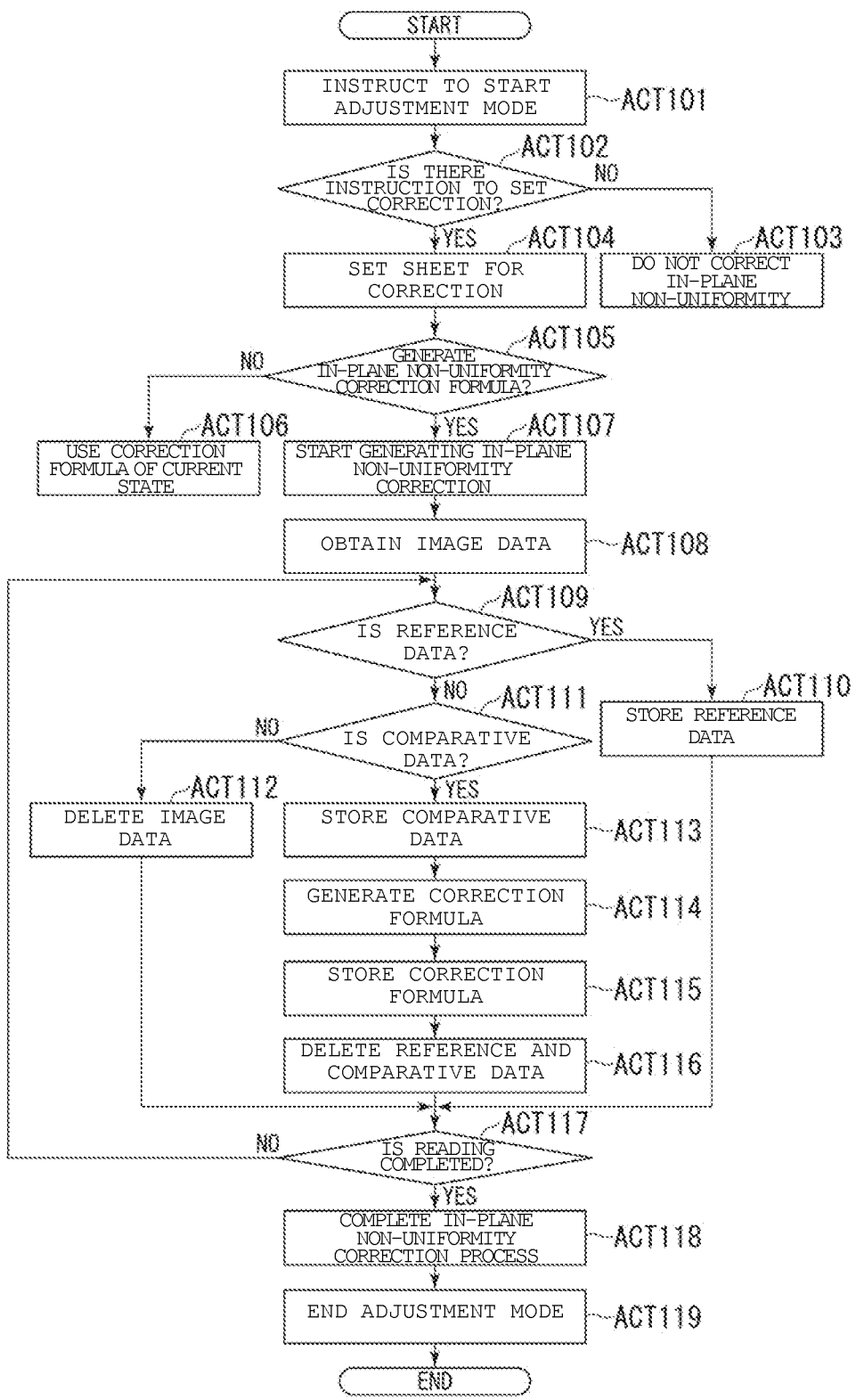
FIG. 11 is a flow chart of a procedure for setting a correction formula carried out by the image processing apparatus.

Next, a procedure for setting a correction formula by the image processing apparatus 100 will be described with reference to FIG. 11. FIG. 11 is a flow chart of the procedure for setting a correction formula by the image processing apparatus 100.

The system CPU 250 receives an instruction from a user via the control panel 1 to start an adjustment mode (ACT101). A plurality of adjustment modes may be prepared besides the adjustment mode to set the in-plane non-uniformity correction formula.

Subsequently, the system. CPU 250 determines whether the adjustment mode to set the in-plane non-uniformity correction formula is chosen from the adjustment modes by the user (ACT102). When the adjustment mode to set the in-plane non-uniformity correction formula is not chosen (ACT102—NO), the system CPU 250 does not execute the adjustment mode to set an in-plane non-uniformity correction formula (ACT103).

Meanwhile, when the adjustment mode to set the in-plane non-uniformity correction formula is chosen by the user (ACT102—YES), the system CPU 250 receives the instruction from the user via the control panel 1 to start the adjustment mode to set the in-plane non-uniformity correction formula.

Next, the sheet for in-plane non-uniformity correction Sr is placed at a predetermined reading position on the placement surface 212a by the user (ACT104). That is, the sheet for correction Sr is placed on the placement surface 212a with the tip end Sa of the sheet for correction Sr aligned to the tip end position 214a.

Subsequently, the user chooses whether to newly set an in-plane non-uniformity correction formula (ACT105). When a new in-plane non-uniformity correction formula is not set (ACT105—NO), the ASIC 211 uses the correction formula that has been already set (ACT106).

When a new in-plane non-uniformity correction formula is set (ACT105—YES), the ASIC process 211 generates the correction formula generation unit 231. The correction formula generation unit 231 starts a process of generating an in-plane non-uniformity correction formula (ACT107).

For example, the user instructs to perform a scan process via the control panel 1. The scanner unit 2 starts a process of scanning the sheet for correction Sr (ACT108).

The image data Dx that the CCD sensor 209 generates is input to the correction formula generation unit 231. The correction formula generation unit 231 determines whether the input image data Dx is the reference data based on the line number of the input image data Dx (ACT109).

When the input image data Dx is determined to be the reference data, the correction formula generation unit 231 writes the image data Dx that is determined to be the reference data into the reference data storing area 2342 (ACT110). For example, the correction formula generation unit 231 writes image data D500 that is determined to be the reference data into the reference data storing area 2342. Here, when information has been already written in the reference data storing area 2342, the correction formula generation unit 231 overwrites the information with the most recent image data D500.

Meanwhile, when the input image data Dx is determined not to be the reference data, the correction formula generation unit 231 determines whether the input image data Dx is the comparative data based on the line number of the input image data Dx (ACT111).

When the input image data Dx is determined not to be the comparative data, the correction formula generation unit 231 deletes the input image data Dx therefrom (ACT112).

Meanwhile, when the input image data Dx is determined to be the comparative data, the correction formula generation unit 231 writes the image data Dx that is determined to be the comparative data into the comparative data storing area 2343 (ACT113). For example, the correction formula generation unit 231 writes image data D2500 that is determined to be the comparative data into the comparative data storing area 2343.

The correction formula generation unit 231 generates a correction formula $f_y$ based on the value of the reference data Dv and the value of the comparative data Dw (ACT114). Specifically, the correction formula generation unit 231 reads the value of the image data D500 from the reference data storing area 2342 and reads the value of the image data D2500 from the comparative data storing area 2343. The correction formula generation unit 231 assigns the values of the reference data Dv and the comparative data Dw in the correction formula $f_y$ described in Expression 1. Consequently, the correction formula generation unit 231 generates the correction formula $f_y$ described in Expression 2.

The correction formula generation unit 231 writes the generated correction formula $f_y$ into the in-plane non-uniformity correction formula storing area 2344 (ACT115).

The correction formula generation unit 231 then deletes the information stored in the comparative data storing area 2343 (ACT116).

Next, the correction formula generation unit 231 determines whether the processes from ACT109 have been performed on the entire image data Dx that the CCD sensor 209 scanned (ACT117).

When it is determined that the entire image data Dx has not been processed (ACT117—NO), the correction formula generation unit 231 returns to ACT109 and repeats the processes.

Meanwhile, when it is determined that the entire image data Dx has been processed (ACT117—YES), the correction formula generation unit 231 completes the process of generating the in-plane non-uniformity correction formula (ACT118).

The correction formula generation unit 231 then ends the adjustment mode (ACT119).

Figure 12:
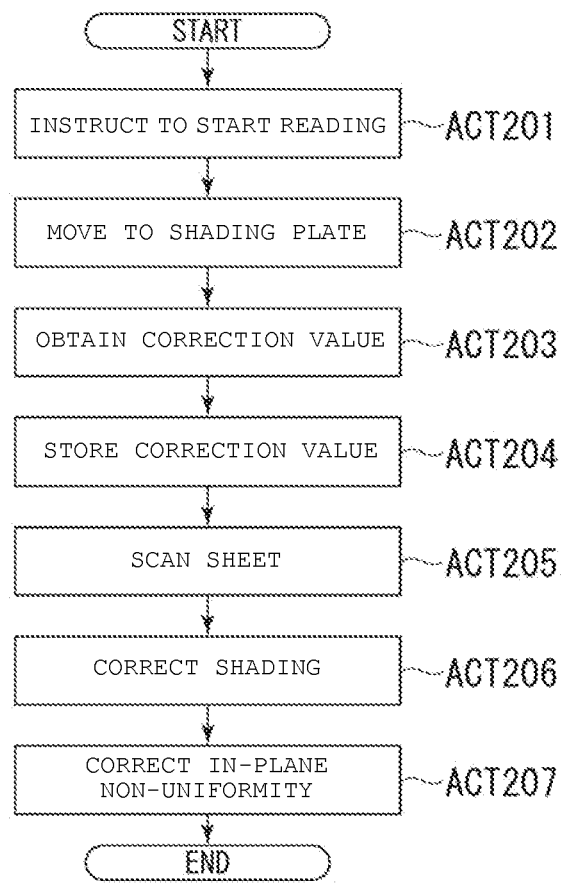
FIG. 12 is a flow chart of a scanning operation by the image processing apparatus.

Next, a reading operation carried out by the image processing apparatus 100 will be described with reference to FIG. 12. FIG. 12 is a flow chart of the reading operation carried out by the image processing apparatus 100.

The system CPU 250 receives an instruction from the user via the control panel 1 to start scanning (ACT201).

The system CPU 250 outputs the received instruction to the scanner CPU 230. The scanner CPU 230 moves the light source 201 under the shading plate 213 (ACT202). The scanner CPU 230 then obtains a correction value $\alpha_y$ for each pixel based on the image data read from the shading plate 213 (ACT203). The shading correction process unit 232 associates the obtained correction value $\alpha_y$ with the pixel number and writes into the shading correction value storing area 2341 (ACT204).

The scanner CPU 230 moves the light source 201 in the sub-scanning direction y to scan the sheet S (ACT205). Consequently, the one-line image data Dx is sequentially input to the ASIC 211.

The shading correction process unit 232 performs the shading correction on each one-line image data Dx (ACT206). That is, the shading correction process unit 232 corrects each pixel value included in the one-line image data Dx based on the corresponding correction value $\alpha_y$.

Next, the in-plane non-uniformity correction process unit 233 performs the in-plane non-uniformity correction on each one-line image data Dx on which the shading correction is performed (ACT207).

The shading correction process unit 232 and the in-plane non-uniformity correction process unit 233 repeatedly perform the processes in ACT206 and ACT207 on each one-line image data Dx.

As described above, the image processing apparatus 100 according to the embodiment performs the shading correction on the image data obtained from the sheet S. This corrects variations in pixel values in the main-scanning direction. In addition, the image processing apparatus 100 performs the in-plane non-uniformity correction on the image data obtained from the sheet S. This corrects variations in the pixel values in the sub-scanning direction y. Therefore, variations in the brightness of the image data that the image processing apparatus 100 scans may be decreased.

The image processing apparatus 100 according to the embodiment generates the correction formula based on the image data obtained from the sheet for correction Sr. The image processing apparatus 100 outputs the calculation result after assigning the image data of the sheet S that has been corrected based on the image data read from the shading plate 213 in the correction formula. According to this configuration, the shading correction and the in-plane non-uniformity correction may be simply performed on the image data that is obtained from the same sheet S.

The image processing apparatus 100 according to the embodiment generates the correction formula for each line of which position is different in the sub-scanning direction y. According to this configuration, the in-plane non-uniformity correction may be performed on the image data with respect to each of the lines in the sub-scanning direction y. Accordingly, variations in the brightness of the image data that the image processing apparatus 100 generates may be decreased.

The image processing apparatus 100 according to the embodiment corrects the image data read from the sheet S based on the difference between the reference data and the comparative data. According to this configuration, the image data that corresponds to the comparative line obtained from the sheet S may be corrected close to the level of the data that corresponds to the reference line.

The image processing apparatus 100 is described as fixing the toner image, but the image processing apparatus 100 may be an inkjet-type image processing apparatus.

The correction formula generation unit 231 generates the correction formulas that correspond to the comparative lines W1 to W4 of which positions are different in the sub-scanning direction y. In this case, the correction formula generation unit 231 may estimate correction formulas that correspond to lines other than the comparative lines W1 to W4 based on the correction formulas that correspond to the comparative lines W1 to W4. For example, the correction formula generation unit 231 estimates the image levels of the lines other than the comparative lines W1 to W4 based on the image levels of the comparative lines W1 to W4. The correction formula generation unit 231 may estimate the image levels of the lines other than the comparative lines W1 to W4 from graphs as illustrated in FIG. 10. The correction formula generation unit 231 may generate the correction formulas that correspond to each line other than the comparative lines W1 to W4 based on the estimated image levels. The correction formula generation unit 231 associates the generated correction formulas with the line numbers and writes into the in-plane non-uniformity correction formula storing area 2344. According to this configuration, the number of comparative data to be obtained decreases. Therefore, a process load for obtaining the image level for each image data is reduced. In addition, the in-plane non-uniformity correction may be performed on the image data of the entire lines in the sub-scanning direction y because the correction values of the lines other than the comparative lines W1 to W4 are generated.

The size and the position of each roller may be arbitrarily designed and changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a platen to support a sheet;
a light source that extends in a main-scanning direction and is configured to move in a sub-scanning direction and irradiate light on the sheet as the light source moves in the sub-scanning direction;
an image sensor configured to generate multiple line image data as the light source moves in the sub-scanning direction, each of the line image data being based on light reflected by the sheet and incident on the image sensor, a first line image data being generated when the light source is at a first position, and a second line image data being generated when the light source is at a second position different from the first position; and
a processor configured to carry out a correction process with respect to each of the line image data using a different correction formula for each of the line image data, the processor being further configured to generate a correction formula to be applied to line image data generated when the light source is at a third position different from the first and second positions based on first and second line image data generated by the image sensor from a plain sheet supported on the platen.

2. The image processing apparatus according to claim 1, wherein
the processor is configured to generate a first correction formula, to be applied to line image data generated when the light source is at the first position and a second correction formula to be applied to line image data generated when the light source is at the second position, the first correction formula being based on first image data generated by the image sensor from the plain sheet, and the second correction formula being based on the second line image data generated by the image sensor from the plain sheet.

3. The image processing apparatus according to claim 2, wherein
the first and second correction formulas, when applied to the first and second line image data, respectively, cause brightness values of the first and second line image data to be the same.

4. The image processing apparatus according to claim 3, wherein
the second position is located forward relative to the first position in the direction in which the light source moves during scanning.

5. The image processing apparatus according to claim 1, wherein
the correction formula to be applied to the line image data generated when the light source is at the third position is generated based on a difference of brightness values between the first and second line image data generated by the image sensor from the plain sheet.

6. The image processing apparatus according to claim 1, further comprising:
a memory unit configured to store the generated correction formula.

7. The image processing apparatus according to claim 1, wherein
the processor is further configured to carry out a second correction process on pixel data in each of the line image data from the image sensor using a second correction formula, before carrying out the correction process.

8. The image processing apparatus according to claim 1, wherein
the first position is separated by a predetermined number of lines from an edge of a scanning range in the sub-scanning direction.

9. A method for generating correction formulas with respect to image data obtained by an image processing apparatus during scanning of a sheet, the method comprising:
moving a light source, which extends in a scanning direction, in a sub-scanning direction through a first position and then a second position while a plain sheet is on a scanning window of the image processing apparatus;
generating first line image data from the plain sheet when the light source is at the first position and second line image data from the plain sheet when the light source is at the second position; and
generating a correction formula to be applied to line image data generated when the light source is at a third position that is different from the first and second positions, based on the first and second line image data.

10. The method according to claim 9, wherein
the correction formula to be applied to the line image data generated when the light source is at the third position is generated based on a difference of brightness values between the first and second line image data.

11. The method according to claim 10, further comprising:
generating a first correction formula to be applied to line image data generated when the light source is at the first position, based on the first line image data; and
generating a second correction formula to be applied to line image data generated when the light source is at the second position, based on the second line image data, wherein
the first and second correction formulas, when applied to the first and second line image data, respectively, cause the brightness values of the first and second line image data to be the same.

12. The method according to claim 11, wherein
the second position is located forward relative to the first position in the direction in which the light source moves during scanning.

13. The method according to claim 9, further comprising: storing the generated correction formula.

14. The method according to claim 9, further comprising:
carrying out a correction process with respect to each image data obtained by the image processing apparatus during subsequent scanning of sheets, using the generated correction formula.

15. An image processing apparatus comprising:
a platen to support a sheet;
a light source that extends in a main-scanning direction and is configured to move in a sub-scanning direction and irradiate light on the sheet as the light source moves in the sub-scanning direction;
an image sensor configured to generate multiple line image data as the light source moves in the sub-scanning direction, each of the line image data being based on light reflected by the sheet and incident on the image sensor, a first line image data being generated when the light source is at a first position, and a second line image data being generated when the light source is at a second position different from the first position; and a processor configured to carry out a correction process with respect to each of the line image data using a different correction formula for each of the line image data, the processor being further configured to generate a first correction formula to be applied to the first line image data and a second correction formula to be applied to the second image data, the first correction formula being based on first line image data generated by the image sensor from a plain sheet supported on the platen, and the second correction formula being based on second line image data generated by the image sensor form the plain sheet, wherein the first and second correction formulas, when applied to the first and second line image data, respectively, cause brightness values of the first and second line image data to be the same.

16. The image processing apparatus according to claim 15, wherein the processor is further configured to generate a third correction formula, to be applied to line image data generated when the light source is at a third position that is different from the first and second positions, based on a difference of brightness values between the first and second line image data generated by the image sensor from the plain sheet.

17. The image processing apparatus according to claim 15, wherein the second position is located forward relative to the first position in the direction in which the light source moves during scanning.

18. The image processing apparatus according to claim 15, further comprising:

a memory unit configured to store the first and second correction formulas.

19. The image processing apparatus according to claim 15, wherein the processor is further configured to carry out a second correction process with respect to pixel data in each of the line image data using a second correction formula, before carrying out the correction process.

20. The image processing apparatus according to claim 15, wherein the first position is separated by a predetermined number of lines from an edge of a scanning range in the sub-scanning direction.

* * * * *